No. 86,027.
PATENTED JAN. 19, 1869.
S. P. MERVINE.
GAS REGULATOR.
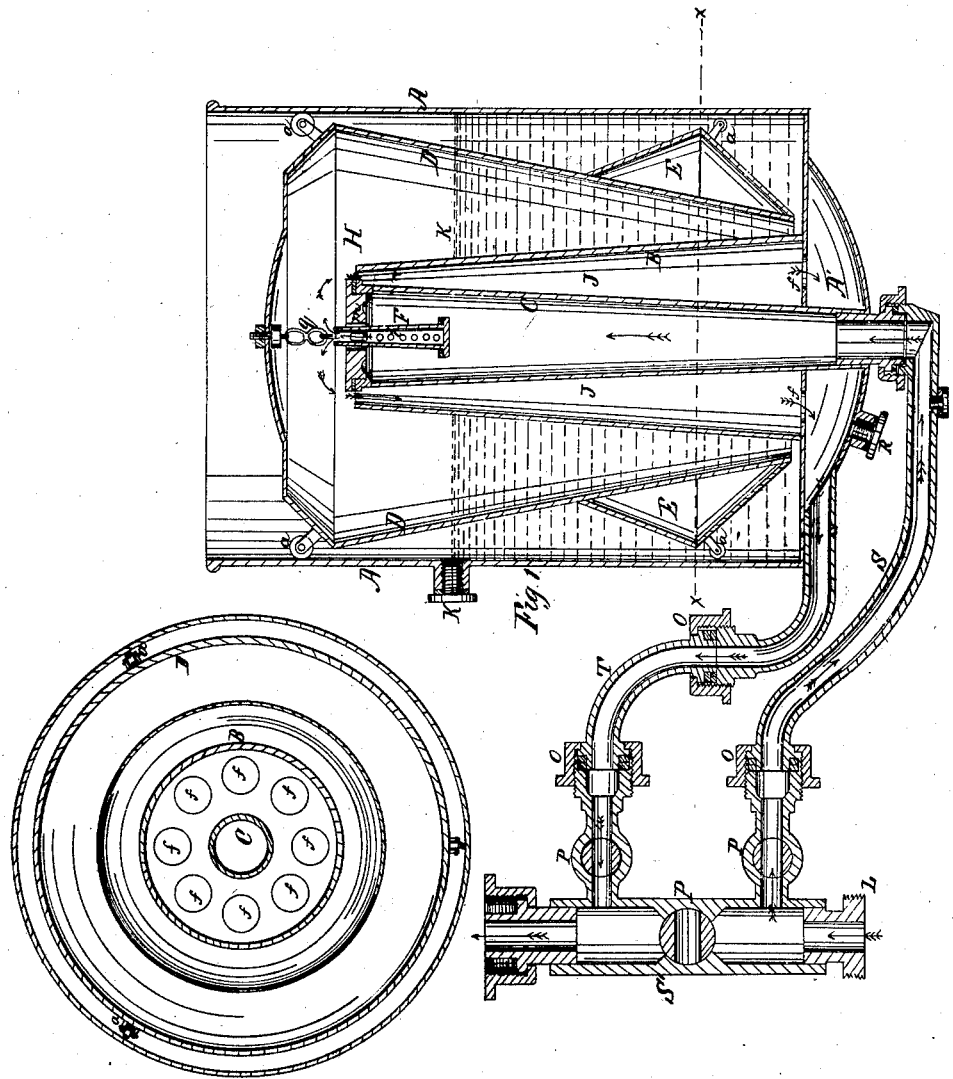
Witnesses.
Inventors.

SAMUEL P. MERVINE, JR., OF PHILADELPHIA, PENNSYLVANIA.

Letters Patent No. 86,027, dated January 19, 1869.

IMPROVED GAS-REGULATOR.

The Schedule referred to in these Letters Patent and making part of the same.

*To all whom it may concern:*

Be it known that I, SAMUEL P. MERVINE, Jr., of the city and county of Philadelphia, in the State of Pennsylvania, have invented an Improved Gas-Regulator; and I do hereby declare that the following is a full, clear, and exact description thereof, reference being had to the accompanying drawing, through letters of reference marked thereon, forming part of this specification, and in which—

Figure 1 represents a central vertical section of an apparatus embracing my improvements, and Figure 2, a horizontal section of the same, taken on the line $x\ x$ of fig. 1.

The same letters, occurring in both figures, indicate like parts.

The object of my invention is to construct a gas-regulator, that shall be more sensitive in its operation, and, at the same time, simpler in its construction, and less liable to derangement of the light by passage of water or the product of condensation into the tubes, as compared with those at present in use; and It consists, first, in a novel arrangement and combination of a series of conical chambers and passages; also, in a peculiar construction and arrangement of an air-chamber, in connection with the regulator.

Furthermore, it consists in a novel construction of the regulating-valve, whereby it becomes self-lubricating.

The peculiar advantages of these several features will hereinafter appear.

To enable others skilled in the art to make and use my invention, I will describe it by referring to the drawing, in which A represents a cylindrical vessel, open at the top, and having a bottom, $b$, flat, or otherwise suitably formed, to the central portion of which is attached a hollow cone, B, extending upwardly about three-fourths the depth of the chamber A; and concentric within the cone B is an inverted hollow cone, C, terminating upwardly at about the same level as the cone B, and passing through the bottom, $b$, and bowl-shaped sink A, beneath, with both of which it is rigidly connected in a water or air-tight manner.

The upper end of this inverted cone C has fitted to it a screw-cap, $m$, in which is provided a central aperture, forming the seat for the valve F, to be more fully explained hereinafter.

The vessel or chamber A is also provided with an aperture in its side, which is closed with a screw-stopper, K, for regulating the level of the water or other fluid contained in said vessel, which occupies the annular space within it and around the conical chimney B.

D represents an inverted conical vessel, open at its lower end, and closed by a contracting and arched cover at its upper end; and around the lower end of which, on its outer periphery, is constructed an air-chamber, E, formed by soldering two curvilinear plates of metal around its lower portion; and which, whilst it is not of sufficient capacity to float said inverted vessel, gives it buoyancy and renders it more sensitive to the fluctuating pressure of the gas in its passage therethrough.

Centrally, at the upper end or cover of this vessel D, is suspended a valve, F, which, as said vessel rises and falls by the varying force or pressure of the gas, opens and closes the aperture in the centre of the cap $m$. This valve is of novel construction, being of hollow conical form, and having a series of apertures in its sides, with a central discharging-passage in direction of the arrows, as well as an annular passage around it, through the aperture in the cap $m$, the principal current being through the central or tubular portion of the valve-stem, and the gas, by this tortuous passage, being caused to disengage from and deposit any aqueous particles, carried with it, in the cavity of the valve, which, accumulating to the level of the lower apertures in the periphery of the hollow stem, will flow over and lubricate the valve, thus accomplishing the twofold purpose of reducing friction in the operation of the valve, and separating and depositing the aqueous particles in the bowl A′, where they may be readily drawn off, and will not cause any flickering of the light at the burners.

The inverted vessel D is furthermore sustained and guided in its central and vertical position and movement within the vessel A, by three or more guide-rollers, $a$, at or near its upper and lower extremities.

The apparatus, thus constructed, and charged with water or other liquid to the level of the stopper K, is attached to the egress-pipe of the meter by means of the coupling L.

The stop-cock P being closed, and those marked P¹ and P² opened, the gas will traverse the pipe S, in the direction indicated by the arrows, passing up the inverted conical chamber C, through and around the hollow valve F, into the chamber H, where it impinges on the concave cover or top thereof, and escapes downwardly through the annular passage J, formed between the conical chimney B and the inverted cone C, and out through a series of apertures, $f$, into the bowl-shaped bottom A′, where any moisture carried over from the meter or regulator is deposited, to be drawn off occasionally at the plug R.

The supply-pipe S is also provided, at its lowest point, with a similar plug, for the removal of any water that may accumulate therein.

From the chamber A, the gas continues its course, through the pipe T, to the burners, in the direction also indicated by arrows.

In case the regulator should get out of order, or, for any reason, it should not be desirable to use it, the gas may pass direct to the burners through the passage S′, by opening the stop-cock P and closing those marked P¹ and P².

By this combination of cones, forming gradually-enlarging passages through the regulator, it will be seen that the passage of the gas can in no degree affect its action by friction, or impinging on any of its sides or other parts, but that its action will be controlled entirely by the pressure of the volume within the chamber H acting to raise the float D, and, at the same time, to contract the annular orifice around the valve F, and to reduce the number of apertures, i, in its hollow stem, by covering a portion of them up, or raising some of them above the cap m, when they become egress instead of ingress-apertures.

It will also be seen that by the angular or conical formation of the air-chamber or float E, and its arrangement outside of the inverted vessel D, the tendency to raise a body of water inside the float, and force it into the inlet or outlet-passages, is avoided, the float is relieved from the pressure of gas, and in rising and sinking in the water, it presents a cutting or dividing-edge, instead of a direct or flat resistance.

Besides these advantages in its operation, it consists of a small number of pieces, put together in a manner to be much more easily and cheaply constructed, and less liable to leakage than any heretofore manufactured.

Having thus described my invention,
What is claimed as new, and desired to be secured by Letters Patent, is—

1. The combination of the cones B and C, forming gradually-enlarging passages for the ingress and egress of the gas to and from the chamber H, substantially as set forth.

2. The hollow conical valve F, constructed with apertures i, arranged and operating substantially as shown and described.

3. The arrangement of the air-chamber E around the outer periphery of the inverted vessel D, as shown and described.

4. The double conical construction of the air-chamber E, substantially as shown and described, for the purposes set forth.

SAM'L P. MERVINE, Jr.

Witnesses:
J. R. MASSEY,
L. BANES.